United States Patent
Sawai et al.

(10) Patent No.: US 9,931,915 B2
(45) Date of Patent: Apr. 3, 2018

(54) SLIDING MEMBER, SUNSHADE DEVICE PROVIDED WITH THE SLIDING MEMBER AND MOTOR VEHICLE EQUIPPED WITH THE SUNSHADE DEVICE

(71) Applicant: HOWA TEXTILE INDUSTRY CO., LTD., Kasugai-shi, Aichi (JP)

(72) Inventors: Takahiro Sawai, Kasugai (JP); Hiroki Koyama, Kasugai (JP)

(73) Assignee: HOWA TEXTILE INDUSTRY CO., LTD., Kasugai-shi (JP)

( * ) Notice: Subject to any disclaimer, the term of this patent is extended or adjusted under 35 U.S.C. 154(b) by 0 days.

(21) Appl. No.: 15/244,316

(22) Filed: Aug. 23, 2016

(65) Prior Publication Data

US 2017/0066308 A1    Mar. 9, 2017

(30) Foreign Application Priority Data

Sep. 4, 2015   (JP) ................................. 2015-174788

(51) Int. Cl.
*B60J 7/02* (2006.01)
*B60J 7/00* (2006.01)

(52) U.S. Cl.
CPC .................. *B60J 7/003* (2013.01); *B60J 7/02* (2013.01)

(58) Field of Classification Search
CPC ............... B60J 7/003; B60J 7/02; B60J 7/053
USPC ........................................... 296/214, 216.08
See application file for complete search history.

(56) References Cited

FOREIGN PATENT DOCUMENTS

JP    H09-277835 A    10/1997

*Primary Examiner* — Dennis H Pedder
(74) *Attorney, Agent, or Firm* — Oliff PLC

(57) ABSTRACT

A sliding member includes a casing and a plate spring. The plate spring is placed in a middle accommodating portion of the casing between front and rear portions of a middle lower wall portion and a protruding portion of a middle upper wall portion constructed by a mountain-shaped wall portion and the protruding portion.

14 Claims, 13 Drawing Sheets

SLIDING MEMBER, SUNSHADE DEVICE PROVIDED WITH THE SLIDING MEMBER AND MOTOR VEHICLE EQUIPPED WITH THE SUNSHADE DEVICE

BACKGROUND OF THE INVENTION

Field of the Invention

The present invention relates to a sliding member, a sunshade device provided with the sliding member, and a motor vehicle equipped with the sunshade device.

Related Art

Conventionally, in a sliding member of this type, a sliding contact tool for a sunlight shielding plate of a sunroof described by JP-A H09-277835 is proposed. Typically, four sliding contact tools for a sunlight shielding plate of a sunroof are mounted on a sunshade. Each of the sliding contact tools includes upper and lower nipping pieces and a spring member.

In each of the sliding contact tools, the spring member is formed from a leaf spring which is made of a metal and curved in an arc shape. The spring member is placed between spring support pieces of the lower nipping piece in a space between the upper and lower nipping pieces. The spring member is supported at its support ends supported by the spring support pieces of the lower nipping piece. Accordingly, the spring member is curved at its central portion from the support ends toward the upper nipping piece in the arc shape.

The respective sliding contact tools are mounted on the sunshade as follows. A description will be given by an example of the construction of the sunshade, for mounting the respective sliding contact tools on the sunshade. The sunshade has a mounting part for the sliding contact tool as described below.

The mounting part includes an L-shaped notch, a recessed notch, and a protrusion. The L-shaped notch is formed by cutting out a corner of a side edge of the sunshade in an L shape. The recessed notch is formed by cutting out a longitudinally central portion of the side edge of the sunshade in a recess shape. The protrusion is formed at one side edge of the sunshade between the L-shaped notch and the recessed notch.

When installing each sliding contact tool on the sunshade as constructed above, the upper nipping piece of the sliding contact tool is kept to be open away from the lower nipping piece. In this state, while the lower nipping piece of the sliding contact tool is abutted at its lower nipping piece against a lower surface of the sunshade, a connecting portion a hinge portion of the upper and lower nipping pieces is engaged within the L-shaped notch of the sunshade, and the spring support pieces of the lower nipping piece and the spring member are engaged within the recessed notch of the sunshade.

Thereafter, the upper nipping piece is closed to nip the protrusion of the sunshade with the lower nipping piece. Thus, the protrusion of the sunshade is nipped by the upper and lower nipping pieces between the hinge portion of the upper and lower nipping pieces and the spring support pieces of the lower nipping piece. In this way, the sliding contact tool is installed on the sunshade. Similarly, the remaining sliding contact tools are respectively installed on another corner of the one side and corners of the other side edge of the sunshade.

When in this way the sliding contact tools installed on the sunshade are mounted on both guide rails, the lower nipping piece of each sliding contact tool comes into slide-contact at its sliding contact projection with a lower inner wall surface of each guide rail. On the other hand, the upper nipping piece of each sliding contact tool is pressed at its projection against an upper inner wall surface of each guide rail by an elastic force of the spring member to come into slide-contact with the upper inner wall surface. As a result, the sunshade is supported by the both guide rails via the sliding contact tools.

In the foregoing sliding contact tool for a sunlight shielding plate, however, the spring member is curved in the arc shape as described above. For this reason, it is necessary to perform extra works including machining to curve the spring member in the arc shape and annealing after the machining.

Further, in case the sliding contact tool is mounted on a guide rail, it is necessary to manage appropriately the degree of curvature of the spring member and the distance between support ends, for appropriately setting a reaction force of the spring member against the guide rail. Consequently, it causes drawbacks that these works become troublesome and difficult works.

SUMMARY OF THE INVENTION

It is therefore an object of the present invention to provide a sliding member utilizing a plate-shaped spring so as to eliminate extra processing or machining of the spring and management of a reaction force of the spring against a guide rail.

It is another object of the present invention to provide a sunshade device provided with the sliding member.

It is still another object of the present invention to provide a motor vehicle equipped with the sunshade device.

In order to solve these objects according to the present invention, there is provided a sliding member comprising:

a casing formed from synthetic resin so as to construct a laterally oriented U-shape in its cross-section with an upper wall, a lower wall and a bottom wall longitudinally in a front-and-rear direction, and a plate spring, wherein said casing is partitioned and formed at its interior into a front concave accommodation portion, a middle concave accommodation portion and a rear concave accommodation portion by a front partitioning portion and a rear partitioning portion formed between said upper wall and said lower wall with a distance therebetween along a front-and-rear direction of said bottom wall, wherein said upper wall includes a middle upper wall portion corresponding to said middle concave accommodation portion, said middle upper wall portion having a mountain-shaped wall portion formed to protrude upwardly in a mountain-shape, and a protruding portion protruding downwardly from said mountain-shaped wall portion, wherein said lower wall includes a middle lower wall portion corresponding to said middle concave accommodation portion, said middle lower wall portion having front and rear portions and a front-and-rear directional intermediate portion provided between said front and rear portions formed to protrude upwardly from front and rear end portions of said front-and-rear directional intermediate portion, and wherein said plate spring is interposed in said middle concave accommodation portion between said front and rear portions of said middle lower wall portion and said protruding portion of said middle upper wall portion so as to be a convex curved shape downwardly.

With this construction, the middle upper wall portion of the casing includes the mountain-shaped wall portion and the protruding portion. Moreover, the middle lower wall portion includes the front and rear portions and the front-and-rear directional middle portion, and is formed to protrude upward from the front and rear ends in the front and rear portions.

Accordingly, the plate spring is interposed between the front and rear portions of the middle lower wall portion and the protruding portion so as to be a convex curved shape downwardly in the middle concave accommodation portion of the casing.

Thus, the sliding member is pressed at the mountain-shaped wall portion and the protruding portion of the casing toward the middle lower wall portion by an upper rail wall of the guide rail, when the sliding member is fitted at its casing into a guide rail of a guide rail device.

Consequently, the plate spring is curved downward by the movement of the protruding portion, thereby to generate a reaction force so as to exert it to the upper rail wall via the protruding portion and the mountain-shaped wall portion. Even when the spring which generates a reaction force is a plate spring, it is useful to form an operation force which can maintain a good operation feeling of an occupant.

Further, since the spring which generates a reaction force is a plate spring, the construction of a spring which is required for generating a reaction force in a sliding member is further simplified.

Further, according to the present invention, in the above-mentioned sliding member, said front partitioning portion of said casing is formed with front up-and-down directional coupling wall portions forming opposing wall portions of said front concave accommodation portion and said middle concave accommodation portion, and a front front-and-rear directional coupling wall portion coupling said front up-and-down directional coupling wall portions mutually, and said rear partitioning portion of said casing is formed with rear up-and-down directional coupling wall portions forming opposing wall portions of said middle concave accommodation portion and said rear concave accommodation portion, and a rear front-and-rear directional coupling wall portion coupling said rear up-and-down directional coupling wall portions mutually.

With this construction, the front and rear partitioning portions are easily to bend. For this reason, stress applied to both sides of the front partitioning portion and both sides of the rear partitioning portion of the casing can be appropriately alleviated by the front and rear partitioning portions. As a result, even if a guide rail to which the sliding member is applied has a linear or curved shape, the sliding member can smoothly slide in the guide rail when it is fitted into the guide rail.

Still further, according to the present invention, in the above-mentioned sliding member, said front partitioning portion of said casing partitions said front concave accommodation portion and said middle concave accommodation portion mutually by forming the opposing wall portions of said front concave accommodation portion and said middle concave accommodation portion with a single front up-and-down directional coupling wall portion, and said rear partitioning portion of said casing partitions said middle concave accommodation portion and said rear concave accommodation portion mutually by forming the opposing wall portions of said middle concave accommodation portion and said rear concave accommodation portion with a single rear up-and-down directional coupling wall portion.

As described above, even if the front partitioning portion is formed by forming the opposing wall portions of the front concave accommodation portion and middle concave accommodation portion with a single coupling wall portion and the rear partitioning portion is formed by forming the opposing wall portions of the middle concave accommodation portion and rear concave accommodation portion with a single coupling wall portion, the sliding member can smoothly slide in the guide rail, when the guide rail to which the sliding member is applied is linear. Additionally, even if the guide rail is curved, the sliding member can substantially slide in the guide rail.

Still further, according to the present invention, in the above-mentioned the sliding member, the front partitioning portion of the casing is constructed as a U-shaped front partitioning portion by coupling the coupling wall portion between lower ends of the coupling wall portions, and the rear partitioning portion of the casing is constructed as a U-shaped rear partitioning portion by coupling the coupling wall portion between lower ends of the coupling wall portions.

Even when the front and rear partitioning portions are respectively in a U-shape, operations and effects similar to those of the present invention described above can be attained.

Still further, according to the present invention, in the above-mentioned the sliding member, the front partitioning portion of the casing is constructed as an H-shaped front partitioning portion by coupling the coupling wall portion between up-and-down directional intermediate portions of the coupling wall portions, and the rear partitioning portion of the casing is constructed as an H-shaped rear partitioning portion by coupling the coupling wall portion between up-and-down directional intermediate portions of the coupling wall portions.

With this construction, even when the front and rear partitioning portions of the casing are formed in an H-shape, operations and effects similar to those described above can be attained.

Further, according to the present invention, there is provided a sunshade device provided with sliding members, which comprises;

four sliding members and a sunshade, wherein each of said sliding members includes a casing formed from synthetic resin so as to construct a laterally oriented U-shape in its cross-section with an upper wall, a lower wall and a bottom wall longitudinally in a front-and-rear direction, and a plate spring, said casing is partitioned and formed at its interior into a front concave accommodation portion, a middle concave accommodation portion and a rear concave accommodation portion by a front partitioning portion and a rear partitioning portion formed between said upper wall and said lower wall with a distance therebetween along a front-and-rear direction of said bottom wall, said upper wall includes a middle upper wall portion corresponding to said middle concave accommodation portion, said middle upper wall portion having a mountain-shaped wall portion formed to protrude upwardly in a mountain-shape, and a protruding portion protruding downwardly from said mountain-shaped wall portion, said lower wall includes a middle lower wall portion corresponding to said middle concave accommodation portion, said middle lower wall portion having front and rear portions and a front-and-rear directional intermediate portion provided between said front and rear portions formed to protrude upwardly from front and rear end portions of said front-and-rear directional intermediate portion, and said plate spring is interposed in said middle concave accommodation portion between said front and rear portions of said middle lower wall portion and said protruding portion of said middle upper wall portion so as to be a convex curved shape downwardly, and wherein said sunshade has forked protruding portions respectively formed at front, rear, left and right edges of said sunshade, and the forked protruding portions of said sunshade are assembled in said front concave accommodation portion and said rear concave accommodation portion of each of said sliding members.

As described above, the sunshade device comprises the sliding members and the sunshade. In the sunshade device, the respective sliding members constructed as described above are mounted on the sunshade. Therefore, it is possible to provide the sunshade device capable of attaining the operations and effects described above.

Further, according to the present invention, in each of said sliding members of the above-mentioned sunshade device, said front partitioning portion of said casing is formed with front up-and-down directional coupling wall portions forming opposing wall portions of said front concave accommodation portion and said middle concave accommodation portion, and a front front-and-rear directional coupling wall portion coupling said front up-and-down directional coupling wall portions, and said rear partitioning portion of said casing is formed with rear up-and-down directional coupling wall portions forming opposing wall portions of said middle concave accommodation portion and rear concave accommodation portion, and a rear front-and-rear directional coupling wall portion coupling said rear up-and-down directional coupling wall portions.

Since the front and rear partitioning portions of the casing are formed as described above, it is possible to provide the sunshade device capable of attaining the operations and effects described above.

Still further, according to the present invention, in each of the four sliding members of the above-mentioned sunshade device, said front partitioning portion of said casing is constructed as a U-shaped front partitioning portion by coupling said front front-and-rear directional coupling wall portion between lower ends of said front up-and-down directional coupling wall portions, and said rear partitioning portion of said casing is constructed as a U-shaped rear partitioning portion by coupling said rear front-and-rear directional coupling wall portion between lower ends of said rear up-and-down directional coupling wall portions.

With this construction, since the front and partitioning portions of the casing are formed respectively in a U shape, it is possible to provide the sunshade capable of reliably attaining the operations and effects described above.

Further, according to the present invention, there is provided a motor vehicle equipped with a sunshade device and provided with a roof including an outer board having a window formed therein and an inner board having an opening portion formed therein so as to face the window, which comprises:

a guide rail device including left and right horizontally oriented U-shaped guide rails mounted on left and right edges of the opening portion of the inner board so as to open oppositely to each other; and a sunshade device including four sliding members and a sunshade, wherein each of said sliding members includes a casing formed from synthetic resin so as to construct a laterally oriented U-shape in its cross-section with an upper wall, a lower wall, and a bottom wall longitudinally in a front-and-rear direction, and a plate spring, said casing is partitioned and formed at its interior into a front concave accommodation portion, a middle concave accommodation portion and a rear concave accommodation portion by a front partitioning portion and a rear partitioning portion formed between said upper wall and said lower wall with a distance therebetween along a front-and-rear direction of said bottom wall, said upper wall includes a middle upper wall portion corresponding to said middle concave accommodation portion (B), said middle upper wall portion having a mountain-shaped wall portion formed to protrude upwardly in a mountain-shape, and a protruding portion protruding downwardly from said mountain-shaped wall portion, said lower wall includes a middle lower wall portion corresponding to said middle concave accommodation portion, said middle lower wall portion having front and rear portions and a front-and-rear directional intermediate portion provided between said front and rear portions formed to protrude upwardly from front and rear end portions of said front-and-rear directional intermediate portion, said plate spring is interposed in said middle concave accommodation portion between said front and rear portions of said middle lower wall portion and said protruding portion of said middle upper wall portion so as to be a convex curved shape downwardly, wherein said sunshade has forked protruding portions respectively formed at front, rear, left and right edges of said sunshade, and the forked protruding portions of said sunshade are assembled in said front concave accommodation portion and said rear concave accommodation portion of each of said four sliding members, and wherein two sliding members of said four sliding members are slidably fitted at their casings into said left horizontally oriented U-shaped guide rail, and the remaining two sliding members of said four sliding members are slidably fitted at their casings into said right horizontally oriented U-shaped guide rail.

As described above, the motor vehicle includes the guide rail device and the sunshade device. In the motor vehicle, the sunshade device constructed as described above is mounted on the guide rail device. Therefore, it is possible to provide the motor vehicle capable of attaining the operations and effects described above.

Still further, according to the present invention, in the above-mentioned motor vehicle, said guide rail device is constructed at its left horizontally oriented U-shaped guide rail by a bottom rail wall and upper and lower rail walls extending rightward from upper and lower edges of said bottom rail wall, and is constructed at its right horizontally oriented U-shaped guide rail by a bottom rail wall and upper and lower rail walls extending from upper and lower edges of said bottom rail wall so as to face said upper and lower rail walls of said left horizontally oriented U-shaped guide rail.

Said left and right horizontally oriented U-shaped guide rails are formed respectively as a curved guide rail so as to have a convex curved shape from one of said upper and lower rail walls to the other rail wall.

In each of said sliding members of said sunshade device, said front partitioning portion of said casing is formed with front up-and-down directional coupling wall portions forming opposing wall portions of said front concave accommodation portion and said middle concave accommodation portion, and a front front-and-rear directional coupling wall portion coupling said front up-and-down directional coupling wall portions, and said rear partitioning portion of said casing is formed with rear up-and-down directional coupling wall portions forming opposing wall portions of said middle concave accommodation portion and rear concave accommodation portion, and a rear front-and-rear directional coupling wall portion coupling said rear up-and-down directional coupling wall portions.

And, in said sunshade device two sliding members of said four sliding members are slidably fitted at their casings into said left horizontally oriented U-shaped guide rail, and the remaining two sliding members of said four sliding members are slidably fitted at their casings into said right horizontally oriented U-shaped guide rail.

With this construction, in the sunshade device, the front and rear partitioning portions of the casing of each of the sliding members are constructed as described above and the respective sliding members are mounted on the curved guide rails of the guide rail device as described above. Accordingly, it is possible to further improve the operations and effects described above while efficiently absorbing bending of the sliding member caused by the curved shape of each of the guide rails of the guide rail device with the above-mentioned construction of the front and rear partitioning portions of the casing.

Still further, according to the present invention, in each of the sliding members of the sunshade device of the above-mentioned motor vehicle, said front partitioning portion of said casing is constructed as a U-shaped front partitioning portion by coupling said front front-and-rear directional coupling wall portion between lower ends of said front up-and-down directional coupling wall portions, and said rear partitioning portion of said casing is constructed as a U-shaped rear partitioning portion by coupling said rear front-and-rear directional coupling wall portion between lower ends of said rear up-and-down directional coupling wall portions.

And, two sliding members of said four sliding members are slidably fitted at their casings into said left horizontally oriented U-shaped guide rail, and the remaining two sliding members of said four sliding members are slidably fitted at their casings into said right horizontally oriented U-shaped guide rail.

As described above, in the sunshade device, the front and rear partitioning portions of the casings of the respective sliding members are formed in a U-shape. Accordingly, it is possible to provide a motor vehicle capable of further improving the operations and effects described above while efficiently absorbing bending of the sliding member caused by the curved shape of each of the guide rails of the guide rail device with the above-mentioned construction of the front and rear partitioning portions of the casing.

Still further, according to the present invention, in said casing of each of said sliding members of the sunshade device of the above-mentioned motor vehicle, a length between said protruding portion of said middle upper wall portion and one of said front partitioning wall portion and said rear partitioning wall portion, a height of a top portion of mountain-shaped wall portion, an extended length of said front and rear portions of said middle lower wall portion and a protruding length of said protruding portion are set in such a manner that a reaction force generated in said plate spring when each of said sliding members is fitted at its casing into corresponding guide rail of said guide rail device to press said mountain-shaped wall portion of each casing into said corresponding guide rail against said each corresponding plate spring becomes an appropriate operation force to said sunshade device for an occupant.

By constructing the casing of each of the sliding members as described above, it is possible to operate the sunshade device with an appropriate operation force when an occupant operates the sunshade device.

BRIEF DESCRIPTION OF DRAWINGS

Other features and advantages of the invention will be apparent from the following description taken in connection with the accompanying drawings, wherein.

DETAILED DESCRIPTION OF THE PREFERRED EMBODIMENTS

Hereinafter, embodiments of the present invention will be described with reference to the drawings.

Figure 1:
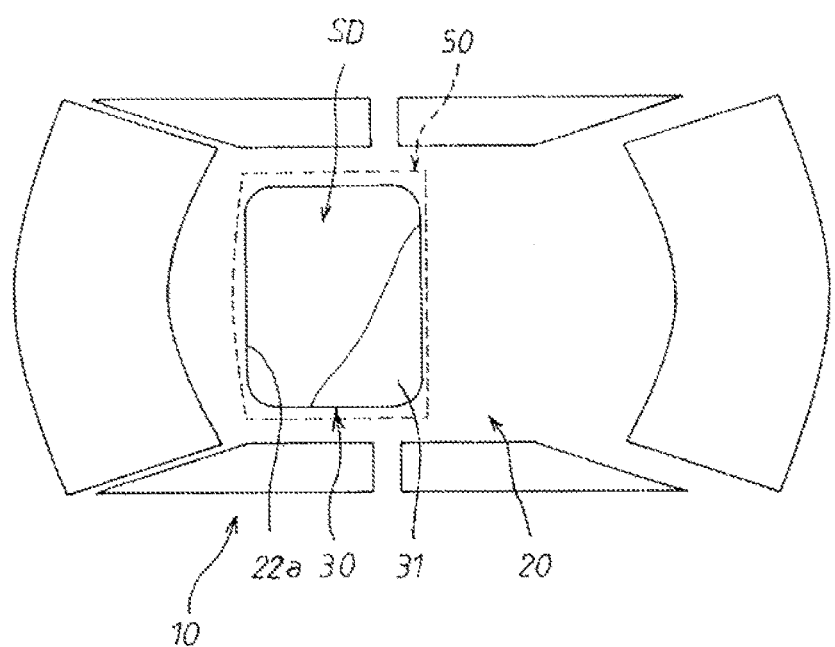
FIG. 1 is a partially broken schematic plan view of a motor vehicle to which a sunshade device according to a first embodiment of the present invention is applied.
Figure 2:
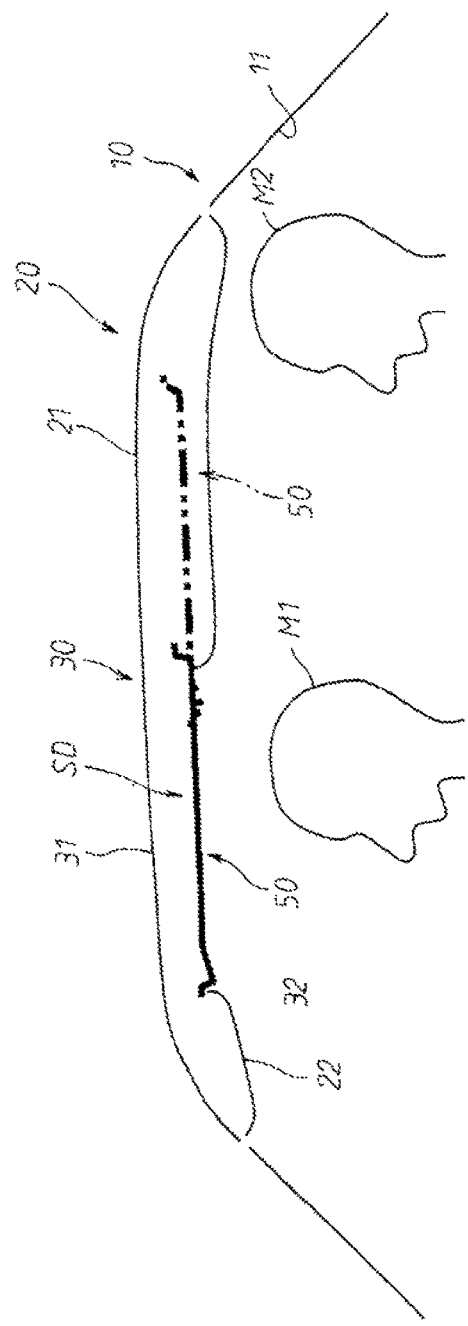
FIG. 2 is a schematic longitudinal cross-sectional view of essential portions of the motor vehicle shown in FIG. 1.
Figure 3:
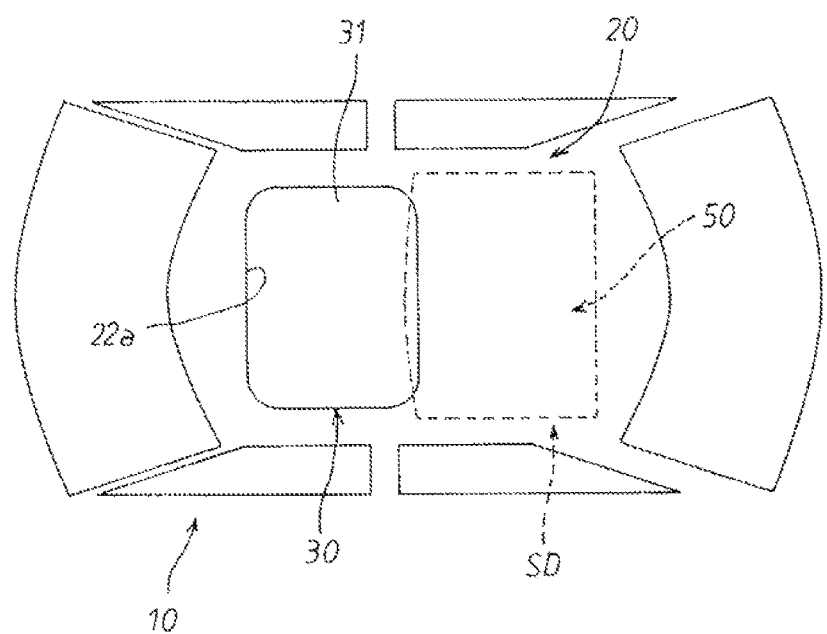
FIG. 3 is a schematic plan view of the motor vehicle to which the sunshade device according to the first embodiment of the present invention is applied.

FIG. 1 to FIG. 3 indicate a sunshade device SD according to a first embodiment of the present invention that is applicable to an motor vehicle. The motor vehicle includes a motor vehicle body 10, and a window 30 is provided on a roof 20 of the motor vehicle body 10. As will be described later, the roof 20 acts a roll as a sunroof of the motor vehicle having the window 30, and includes an outer board 21 and an inner board 22 (see FIG. 2).

As shown in FIG. 1 or 2, the window 30 includes a transparent panel 31 such as transparent glass or synthetic resin, and a window opening portion 32. The transparent panel 31 is fitted into a fitting opening portion 22a (see FIG. 1 or 3) which is formed in the outer board 21 of the roof 20.

The window opening 32 is, as shown in FIG. 2, formed in the inner board 22 of the roof 20 to face the transparent panel 31 from below. Specifically, the window opening portion 32 is formed in the roof 20 to face a front seat of front and rear seats (not shown) in a vehicle compartment 11 (see FIG. 2) of the motor vehicle body 10 from above (refer to FIG. 1 to FIG. 3).

In the first embodiment, as shown in FIG. 2, reference characters M1, M2 indicate respectively occupants seating the above-mentioned front and rear seats. In addition, In FIG. 1 and FIG. 3, the left side of the drawings corresponds to the front side of the motor vehicle body 10, and the right side of the drawings corresponds to the rear side of the motor vehicle body 10. Accordingly, in FIG. 1 and FIG. 3, the lower side of the drawings corresponds to the left side of the motor vehicle body 10 and the upper side of the drawings corresponds to the right side of the motor vehicle body 10.

The sunshade device SD is supported to the window opening portion 32 of the window 30 by way of a guide rail device 40 (see FIG. 4) slidably in a front-and-rear direction.

Figure 4:
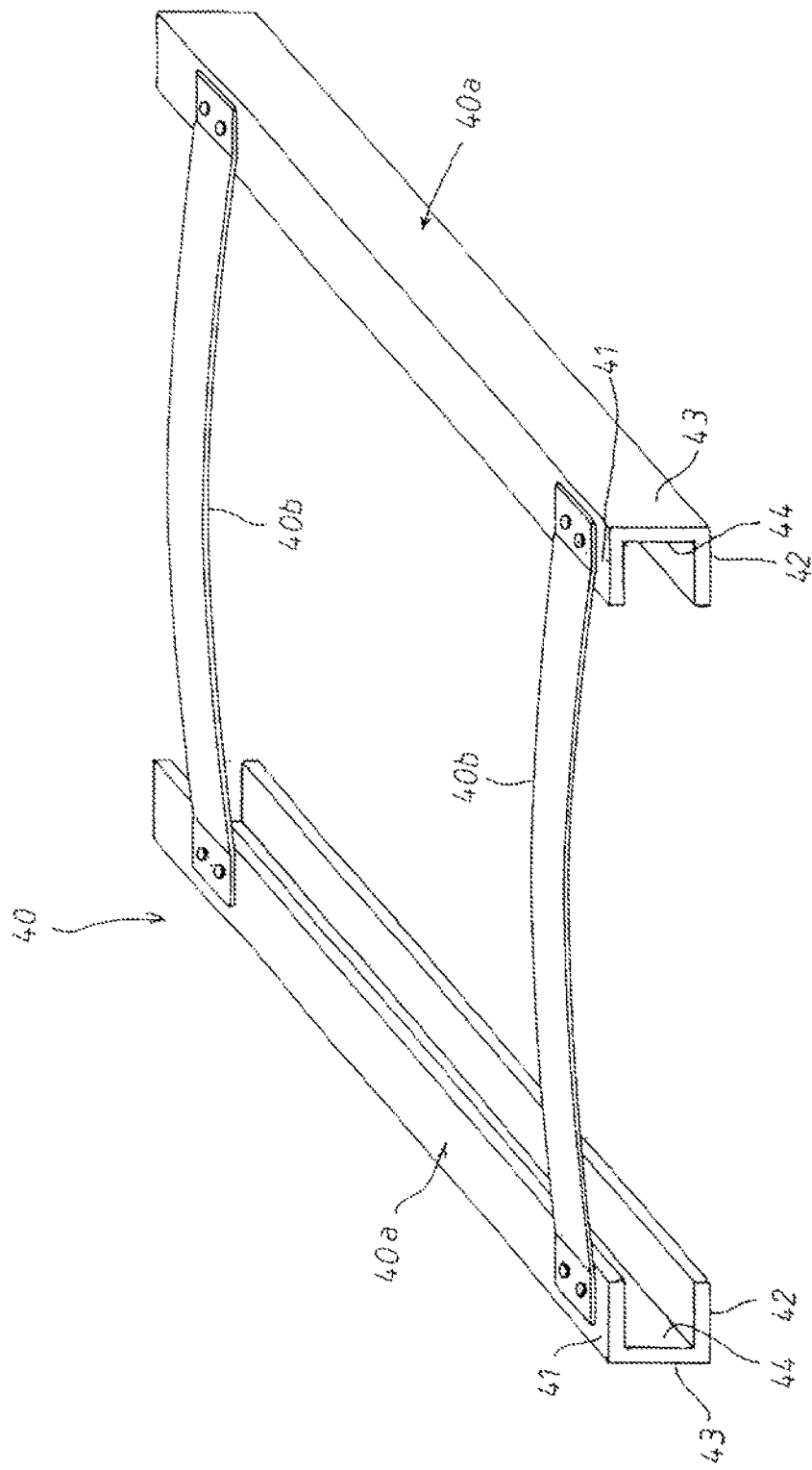
FIG. 4 is a perspective view of a guide rail device according to the first embodiment.

The guide rail device 40 is mounted on the window opening portion 32 between the outer board 21 and the inner board 22 of the roof 20. As shown in FIG. 4, the guide rail device 40 includes left and right guide rails 40a and front and rear band-shaped support plates 40b. Each of the left and right guide rails 40a is formed from a metal material such as aluminum so as to have an upper rail wall 41, a lower rail wall 42 and a bottom rail wall 43.

In the first embodiment, the upper rail wall 41, the lower rail wall 42 and the bottom rail wall 43 are respectively a plate wall, and thus each of the left and right guide rails 40a is a linear rail.

In the left guide rail 40a, the upper rail wall 41 and the lower rail wall 42 extend from upper and lower edges of the bottom rail wall 43 rightward parallel to each other. The left guide rail 40a is thus formed by the upper rail wall 41, the lower rail wall 42 and the bottom rail wall 43 so as to have a horizontally oriented U-shaped transverse cross-section. A groove portion 44 is formed in the left guide rail 40a so as to open rightward.

On the other hand, in the right guide rail 40a, the upper rail wall 41 and the lower rail wall 42 extend from upper and lower edges of the bottom rail wall 43 leftward parallel to each other. Thus, the right guide rail 40a is formed by the upper rail wall 41, the lower rail wall 42 and the bottom rail wall 43 so as to have a horizontally oriented U-shaped transverse cross-section. The groove portion 44 is formed in the right guide rail 40a so as to open leftward.

In the first embodiment, the distance between opposing surfaces of the upper rail wall 41 and lower rail wall 42 of each of the left and right guide rails 40a is set in a predetermined distance (e.g., 5.15 (mm)).

The left and right guide rails 40a are then mounted on left and right edges of the opening portion 32 of the inner board 22 between the outer board 21 and the inner board 22 parallel to each other in the front-and-rear direction so as to face opening portions of the grooves 44 face together.

The front band-shaped support plate 40b of the front and rear band-shaped support plates 40b is fixed at its longitudinal ends on front ends of the respective upper rail walls 41 of the left and right guide rails 40a by, for example, spot welding. On the other hand, the rear band-shaped support plate 40b is fixed at its longitudinal ends on rear end neighborhood portions of the respective upper rail walls 41 of the left and right guide rails 40a by, for example, spot welding so as to be located parallel to the front band-shaped support plate 40b. As a result, the front and rear band-shaped support plates 40b act respectively a roll for maintaining the left and right guide rails 40a parallel to each other in a longitudinal direction thereof.

As shown in any of FIG. 1 to FIG. 3 and FIG. 5, the sunshade device SD includes a sunshade 50 and four sliding members SL.

Figure 5:
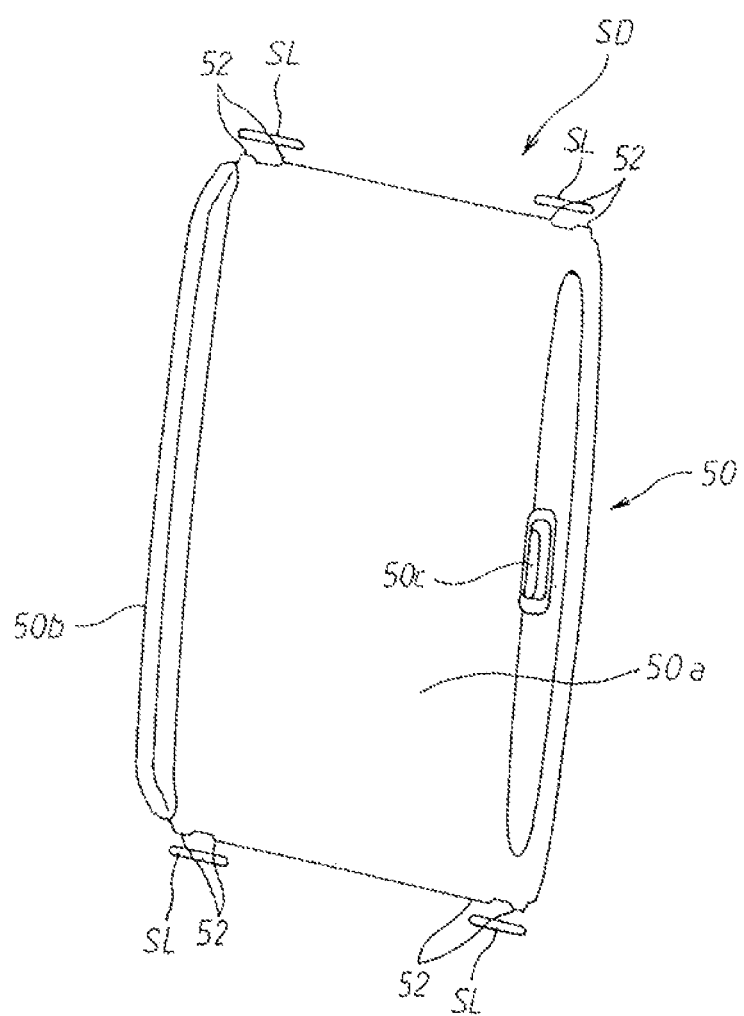
FIG. 5 is a schematic perspective view of the sunshade device according to the first embodiment, where sliding members are separated from a sunshade.

As will be described later, the sunshade 50 is mounted on the left and right guide rails 40a slidably in the front-and-rear direction by way of the respective sliding members SL. As shown in FIG. 5, the sunshade 50 includes a shade main body 50a, an engagement wall 50b and a handle or grip 50c.

The shade main body 50a is formed in a flexible rectangular plate shape by successively laminating a surface skin layer, a back skin layer, an adhesive film layer, a glass fiber mat layer, a layer of synthetic resin, a foam urethane layer, a layer of synthetic resin, a glass fiber mat layer, an adhesive film layer and a back skin layer. Additionally, the surface skin layer of the shade main body 50a is located at its surface (a surface inside of the vehicle compartment 11) to face the vehicle compartment 11.

The engagement wall 50b is formed to extend from a rear end portion of the shade main body 50a upward in an L-shape. In addition, when the sunshade 50 reaches a rear sliding end thereof, the engagement wall 50b engages with a rear inner edge of the window opening portion 32 of the inner board 22, thereby to act a roll for restricting further rearward sliding of the sunshade 50.

The handle 50c is provided at a left-and-right directional center portion of a front end side of the shade main body 50a. Herein, the handle 50c is formed so as to recess concavely into the left-and-right directional center portion of the front end side of the shade main body 50a from its surface side toward a side of the outer board 21.

When an occupant grips and operates the handle 50c in the vehicle compartment 11 in the front-and-rear direction, the sunshade 50 slides along the guide rail device 40 together with the sliding members SL in the front-and-rear direction. In addition, the window 30 is placed in a fully-closed state, when the sunshade 50 is located at its front side sliding end (see FIG. 1 and FIG. 2). When the sunshade 50 is located at the rear side sliding end, the window 30 is placed in a fully-open state (see FIG. 3).

Next, 62b a detailed description will be given of the construction of four sliding members SL. As seen from FIG. 5, the four sliding members SL are respectively assembled to a left front edge portion, a left rear edge portion, a right front edge portion, and a right rear edge portion of the shade main body 50a of the sunshade 50. In the first embodiment, the sliding members SL assembled to the left front edge portion, left rear edge portion, right front edge portion, and right rear edge portion of the shade main body 50a are also respectively referred to as a left front sliding member SL, a left rear sliding member SL, a right front sliding member SL, and a right rear sliding member SL.

The four sliding members SL have the same construction, and thus the construction of the left front sliding member SL of the four sliding members SL is described in detail.

The left front sliding member SL is, as described above, assembled to the left front edge portion of the sunshade 50 (see FIG. 5). In the first embodiment, the right side of FIG. 6 corresponds to a front side of the left front side sliding member SL, and the left side of FIG. 6 corresponds to a rear side of the left front side sliding member SL. Further, the front side of FIG. 6 corresponds to a right side of the left front side sliding member SL, and the rear side of FIG. 6 corresponds to a left side of the left front side sliding member SL. Accordingly, the upper side of FIG. 6 corresponds to an upper side of the left front side sliding member SL, and the lower side of FIG. 6 corresponds to a lower side of the left front side sliding member SL (the inside of the vehicle compartment 11).

Figure 6:
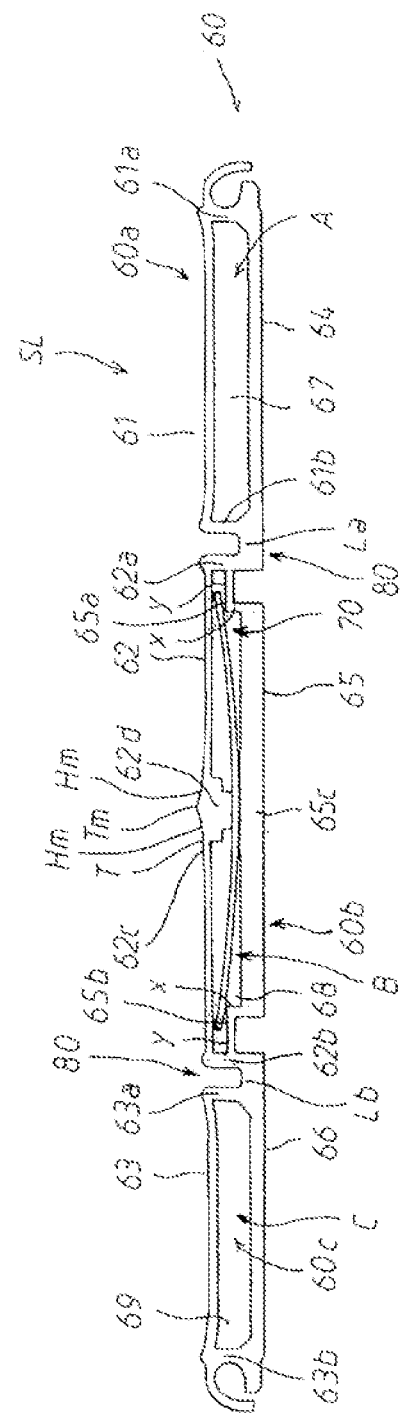
FIG. 6 is an enlarged side view of a left front sliding member shown in FIG. 5 in an original state.
Figure 7:
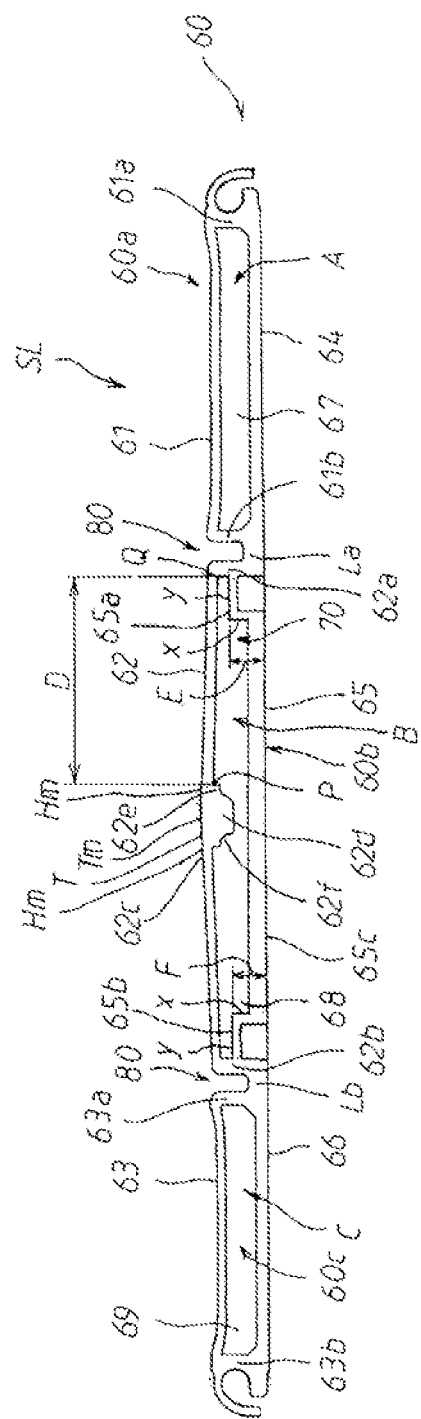
FIG. 7 is a side view of a casing of the left front sliding member shown in FIG. 5.

As shown in FIG. 6, the left front sliding member SL includes a casing 60 and a plate-shaped spring 70. The casing 60 is, as shown in FIG. 6 or 7, formed in a longitudinal shape from a synthetic resin material by injection molding.

The casing 60 includes an upper wall 60a, a lower wall 60b, and a bottom wall 60c. The upper wall 60a and the lower wall 60b extend rightward (the front side of FIG. 6) from upper and lower edge portions of the bottom wall 60c substantially parallel to each other.

The upper wall 60a is formed in a longitudinal shape with a front upper wall portion 61, a middle upper wall portion 62 and a rear upper wall portion 63. The lower wall 60b is formed in a longitudinal shape with a front lower wall portion 64, a middle lower wall portion 65 and a rear lower wall portion 66. The front lower wall portion 64, the middle lower wall portion 65 and the rear lower wall portion 66 face respectively the front upper wall portion 61, the middle upper wall portion 62 and the rear upper wall portion 63.

The bottom wall 60c is formed in a longitudinal shape with a front bottom wall portion 67, a middle bottom wall portion 68, and a rear bottom wall portion 69. The front bottom wall portion 67 corresponds to the front upper wall portion 61 and the front lower wall portion 64. The middle bottom wall portion 68 corresponds to the middle upper wall portion 62 and the middle lower wall portion 65. The rear bottom wall portion 69 corresponds to the rear upper wall portion 63 and the rear lower wall portion 66.

The front upper wall portion 61 and the front lower wall portion 64 are connected or coupled at their left edge portions (rear edge portions of FIG. 6) to upper and lower edge portions of the front bottom wall portion 67. The front upper wall portion 61 and the front lower wall portion 64 extend from the respective left edge portions thereof rightward (the front side of FIG. 6) substantially parallel to each other.

The front upper wall portion 61 is connected or coupled at its front end portion to a front end portion of the front lower wall portion 64 by way of a front up-and-down directional connection or coupling wall portion 61a. A rear end portion of the front upper wall portion 61 is connected or coupled to a rear end of the front lower wall portion 64 by way of a middle up-and-down directional connection or coupling wall portion 61b. Thus, the front upper wall portion 61, the front up-and-down directional coupling wall portion 61a, the front lower wall portion 64 and the middle up-and-down directional coupling wall portion 61b construct a substantially rectangular annular wall (hereinafter, also referred to as "substantially rectangular front annular wall").

The front bottom wall portion 67 is provided on the substantially rectangular front annular wall to close the substantially rectangular front annular wall from its left side (the rear side of FIG. 6).

The front bottom wall portion 67 constitutes or constructs a front concave accommodation portion A integrally with the foregoing substantially rectangular front annular wall. In addition, the front concave accommodation portion A is opened at its opening portion rightward (the front side of FIG. 6).

The middle upper wall portion 62 and the middle lower wall portion 65 are connected or coupled at their left edge portions (rear edge portions of FIG. 6) to upper and lower edge portions of the middle bottom wall portion 68 through an upper portion of the middle upper-lower directional coupling wall portion 62. The middle upper wall portion 62 and the middle lower wall portion 65 extend from their respective left edge portions rightward (the front side of FIG. 6) substantially parallel to each other.

The middle upper wall portion 62 is connected or coupled at its front end portion to a front end portion of the middle lower wall portion 65 through an upper portion of a middle up-and-down directional coupling wall portion 62a. A rear end portion of the middle upper wall portion 62 is connected or coupled to a rear end portion of the middle lower wall portion 65 through an upper portion of a middle up-and-down directional coupling wall portion 62b. Thus, the middle upper wall portion 62, the middle up-and-down directional coupling wall portion 62a, the middle lower wall portion and the middle up-and-down directional coupling wall portion 62b constitute or construct a substantially rectangular annular wall (hereinafter, also referred to as "substantially rectangular middle annular wall").

Herein, the middle upper wall portion 62 includes, as shown in any of FIG. 6 to FIG. 10 and FIG. 11, a mountain-shaped wall portion 62c and a protruding portion 62d. The mountain-shaped portion 62c is formed in a mountain shape convexly upward. A front-and-rear directional center portion (hereinafter, also referred to as "top portion T") of the mountain-shaped wall portion 62c protrudes to the opposite side of the middle lower wall portion 65 (a side of the upper rail wall 41 of the left guide rail 40a) than a line connecting each of upper end portions of both the middle up-and-down directional coupling wall portions 62a and 62b. Further, the mountain-shaped wall portion 62c is inclined like a gentle hem from a top Tm of the top portion T toward the front-and-rear direction (toward the respective upper end portions of the middle up-and-down directional coupling wall portions 62a and 62b). This means that the mountain-shaped wall portion 62c includes the top portion T and a hem portion Hm (see FIG. 6) which is inclined from the top Tm of the top portion T toward the front-and-rear direction.

Accordingly, when the left front sliding member SL is not fitted into the left guide rail 40a, the mountain-shaped wall portion 62c protrudes like a mountain-shape upward (toward the opposite side of the middle lower wall portion 65) than the line connecting the upper end portions of the middle up-and-down directional coupling wall portions 62a and 62b. When the left front sliding member SL is fitted into the left guide rail 40a, the mountain-shaped wall portion 62c is pressed at the top portion T toward a side of the middle lower wall portion 65 by the upper rail wall 41 of the left guide rail 40a. Accordingly, the top portion T of the mountain-shaped wall portion 62c is located at the top Tm in the same position as that of an inner surface of the upper rail wall 41, in other words, located on the line connecting the upper end portions of the middle up-and-down directional coupling wall portions 62a and 62b.

Figure 11:
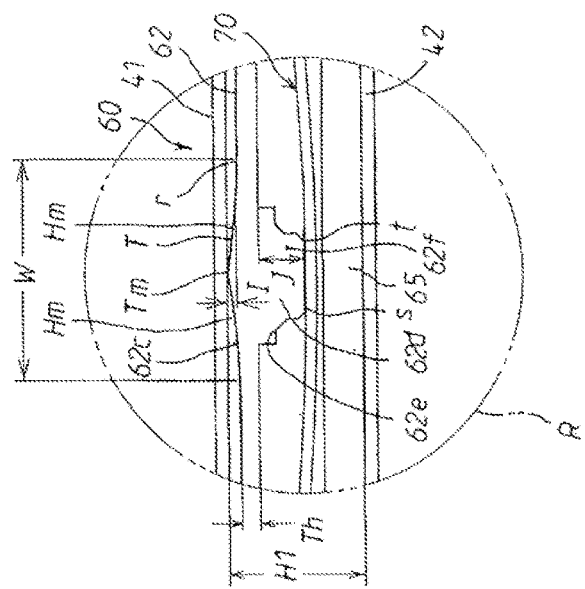
FIG. 11 is a partial enlarged side view of the left front sliding member shown in FIG. 10.

The protruding portion 62d is, as shown in FIG. 7 or 11, formed on the mountain-shaped wall portion 62c so as to protrude downward (toward a side of the middle lower wall portion 65) from the top portion T. The protruding portion 62d includes a large diameter portion 62e and a small diameter portion 62f having a smaller diameter than that of the large diameter portion 62e. The large diameter portion 62e is formed on the top portion T of the mountain-shaped wall portion 62c so as to protrude downward from an inner surface thereof. The small diameter portion 62f is formed on the large diameter portion 62e so as to protrude downward coaxially with the large diameter portion 62e from a protruding end surface thereof.

Herein, a protruding end portion of the small diameter portion 62f is, as shown in FIG. 11, formed at a protruding end surface thereof in a flat shape or plane which is parallel with the lower rail wall 42 of the left guide rail 40a. In addition, the protruding end of the small diameter portion 62f is formed at its outer peripheral edge portion in the form of an arc-shaped cross-section.

As shown in FIG. 7, the middle lower wall portion 65 includes an L-shaped front portion 65a, an L-shaped rear portion 65b, and a plate-shaped intermediate portion 65c. The front portion 65a and the rear portion 65b are formed in an L-shape by a leg portion x and a head portion y.

In the front portion 65a, the leg portion x is connected or coupled at its base end portion to a front end portion of the plate-shaped intermediate portion 65c, and the leg portion x extends upward from a base end portion thereof. The head portion y extends to bend in an L-shape from an extended end portion of the leg portion x to a front side, and the head portion y is connected or coupled at its extended end portion to an up-and-down directional center portion of the middle up-and-down directional coupling wall portion 62a (a boundary portion of an upper portion and a lower portion of the middle up-and-down directional coupling or connection wall portion 62a).

In the rear portion 65b, the leg portion x is connected or coupled at its base end portion to a rear end portion of the plate-shaped intermediate portion 65c, and the leg portion x extends upward from a base end portion thereof. The head portion y extends to bend in an L-shape from an extended end portion of the leg portion x to a rear side, and the head portion y is connected or coupled at its extended end portion to an up-and-down directional center portion of the middle up-and-down directional coupling wall portion 62b (a boundary portion of an upper portion and a lower portion of the middle up-and-down directional coupling wall portion 62b).

The middle bottom wall portion 68 is provided on the foregoing substantially rectangular middle annular wall so as to close the substantially rectangular middle annular wall from the left side (the rear side of FIG. 6). Thus, the middle bottom wall portion 65 constitutes a middle concave accommodation portion B togher with the substantially rectangular middle annular wall. Additionally, the middle concave accommodation portion B is opened at its opening portion rightward (toward the front side of FIG. 6).

The rear upper wall portion 63 and the rear lower wall portion 66 are connected or coupled at their left edge portions (rear edge portions of FIG. 6) to upper and lower edge portions of the rear bottom wall portion 69. The rear upper wall portion 63 and the rear lower wall portion 66 extend from the left edge portions thereof rightward (toward the front side of FIG. 6) substantially parallel to each other.

The rear upper wall portion 63 is connected or coupled at its front end portion to a front end portion of the rear lower wall portion 66 via a middle up-and-down directional connection or coupling wall portion 63a. The rear upper wall portion 63 is connected or coupled at its rear end portion to a rear end portion of the rear lower wall portion 66 via a rear up-and-down directional connection or coupling wall portion 63b. Thus, the rear upper wall portion 63, the middle up-and-down directional connection or coupling wall portion 63a, the rear lower wall portion 66 and the rear up-and-down directional connection or coupling wall portion 63b constitute a substantially rectangular annular wall (hereinafter, also referred to as "substantially rectangular rear annular wall").

The rear bottom wall portion 69 is provided on the foregoing substantially rectangular rear annular wall so as to close the substantially rectangular rear annular wall from the left side (the rear side of FIG. 6). Thus, the rear bottom wall portion 69 constitutes a rear concave accommodation portion C integrally with the substantially rectangular rear annular wall. In addition, the rear concave accommodation portion C is opened at its opening portion rightward.

Figure 10:
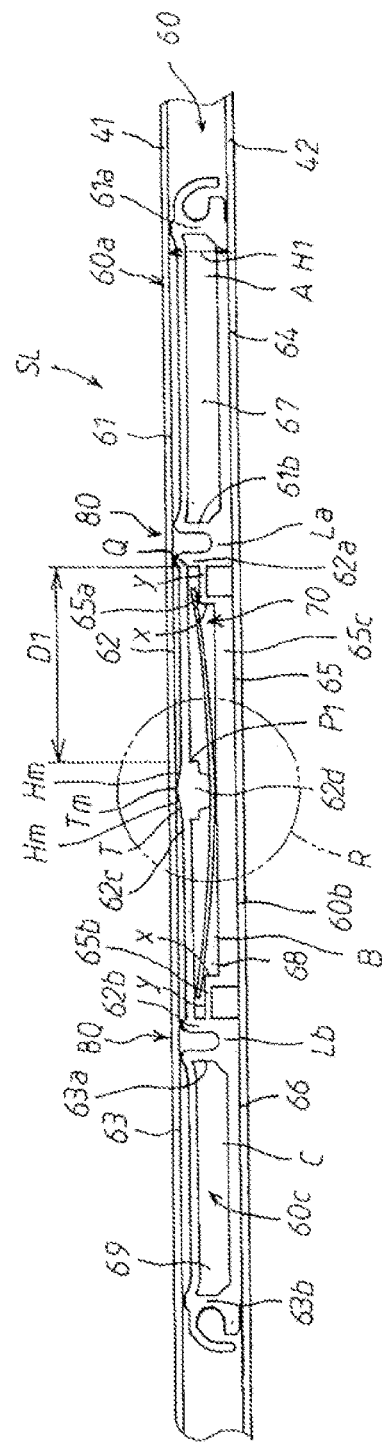
FIG. 10 is an enlarged side view of the left front sliding member shown in FIG. 5 in a state in which a mountain-shape wall portion is pressed.

As shown in FIG. 6 or 10, the plate-shaped spring 70 is interposed between the protruding portion 62d of the middle upper wall portion 62 and the front and rear portions 65a, 65b of the middle lower wall portion 65 within the middle concave accommodation portion B of the casing 60.

Herein, the plate-shaped spring 70 is engaged at its front end portion on the extended end portion of the leg portion x of the front portion 65a of the middle lower wall portion 65, and a rear end portion of the plate-shaped spring 70 is engaged on the extended end portion of the leg portion x of the rear portion 65b of the middle lower wall portion 65. The plate-shaped spring 70 is engaged at its longitudinal directional center portion on the protruding portion 62d of the middle upper wall portion 62 from below.

Accordingly, the plate-shaped spring 70 is interposed between the front and rear portions 65a, 65b of the middle lower wall portion 65 and the protruding portion 62d of the middle upper wall portion 62 in the form of a downward convex curved shape within the middle concave accommodation portion B. Additionally, in this state, the plate-shaped spring 70 is conditioned in the downward convex curved shape, as described above, and a protruding end surface of the protruding portion 62d is flat. From this reason, the longitudinal center portion of the plate-shaped spring 70 is engaged at both portions thereof corresponding to both radial directional end portions of the protruding end surface of the protruding portion 62d on the above-mentioned both radial directional end portions.

In the first embodiment, the plate-shaped spring 70 is formed from a leaf spring material in a rectangular plate shape. The thickness of the plate-shaped spring 70 is predetermined to, for example, 0.4 (mm). The entire length and width of the plate-shaped spring 70 are predetermined to values capable of being accommodated in the middle concave accommodation portion B of the casing 60.

In the first embodiment, in the left front sliding member SL before being fitted into the guide rail (before being pressed in the guide rail), the main dimensions of the casing before the plate-shaped spring 70 is inserted are predetermined as follows (see FIG. 7 or 8).

(1) The height (hereinafter, referred to as "pre-pressing casing height") of the casing 60 before being pressed in the guide rail H is 5.7 (mm).

(2) The front-and-rear directional width W (hereinafter, referred to as "mountain-shaped wall portion front-and-rear width W") of the mountain-shaped wall portion is 8.44 (mm).

(3) In the casing 60 before being pressed in the guide rail, the length D from a front intersection point P (see FIG. 7 or 8) of an outer peripheral surface of the protruding portion 62d and a lower surface of the middle upper wall portion 62 to an intersection point Q (see FIG. 7 or 8) of the lower surface of the middle upper wall portion 62 and a rear surface of the middle up-and-down directional coupling wall portion 62a is 17.008 (mm). The above-mentioned length D is hereinafter referred to as "length D between pre-pressing protruding portion-middle up-and-down directional coupling wall portion".

(4) The extended length E (hereinafter, referred to as "leg portion extended length E") of a leg portion of the L-shaped front portion 65a of the casing 60 and the extended length F (hereinafter, referred to as "leg portion extended length F") of a leg portion of the L-shaped rear portion 65b of the casing 60 have the same value 3.00 (mm).

(5) The height I (hereinafter, referred to as "top portion height I") of the top portion T of the mountain-shaped wall portion 62c is 0.43 (mm).

(6) The protruding distance J (hereinafter, referred to as "protruding portion protruding distance J") between a protruding base end portion of the protruding portion 62d to a lower surface of the middle upper wall portion 62 and a protruding end surface of the protruding portion 62d is 1.82 (mm).

(7) The thickness Th (hereinafter, referred to as "middle upper wall portion thickness Th") of the middle upper wall portion 62 except the mountain-shaped wall portion 62c is 0.8 (mm).

Figure 8:
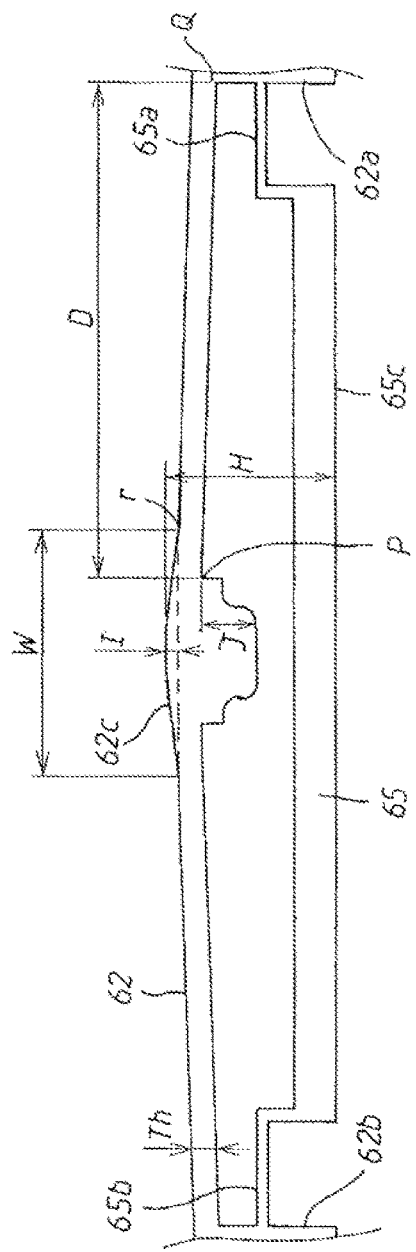
FIG. 8 is a partial enlarged side view of the left front sliding member shown in FIG. 7.
Figure 9:
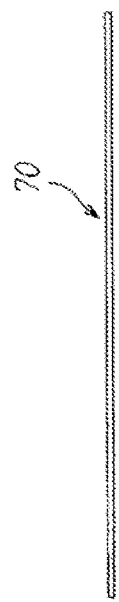
FIG. 9 is a side view of a plate spring of the left front sliding member shown in FIG. 5.

As shown in FIG. 8, the pre-pressing casing height H is the up-and-down directional height of the middle up-and-down directional coupling wall portion 62a from a lower surface of the middle lower wall portion 65 to the top Tm of the mountain-shaped wall portion 62c.

The mountain-shaped wall portion front-and-rear width W is the distance between the respective inclined end portions of the front and rear hem portions Hm of the mountain-shaped wall portion 62c.

As shown in FIG. 7, the leg portion extended length E is the extended length of the leg portion x of the front portion 65a of the middle lower wall portion 65 from a lower surface of the plate-shaped intermediate portion 65c. On the other hand, the leg portion extended length F is the extended length of the leg portion x of the rear portion 65b of the middle lower wall portion 65 from the lower surface of the plate-shaped intermediate portion 65c. The leg portion extended length E is the same as the leg portion extended length F. The lengths E and F are equal to the up-and-down directional length between a lower end of the longitudinal center of the plate-shaped spring 70 accommodated in the middle concave accommodation portion B and an engagement point of each of front and rear end portions of the plate-shaped spring 70 and an extended end portion of each of the leg portions X corresponding to the front and rear end portions.

As shown in FIG. 8, the top portion height I is the up-and-down directional height of the top Tm of the top portion T of the mountain-shaped wall portion 62c from a point r on an upper surface of the mountain-shaped wall portion 62c. In this case, the point r is a point on an inclined lower end of the hem portion Hm of the mountain-shaped wall portion 62c of the casing 60 before the plate-shaped spring 70 is accommodated therein.

In the first embodiment, in a state in which the left front sliding member SL having the plate-shaped spring 70 inserted therein is fitted into the guide rail (a state after the casing 60 is pressed in the guide rail), the main dimensions of the casing 60 of the left front sliding member SL are set as follows (see FIG. 10).

(1) The height of the casing 60 after being pressed in the guide rail (hereinafter, also referred to as "post-pressing casing height") H1 is 5.0 (mm).

(2) In the casing 60 after being pressed in the guide rail, the length from a front intersection point P1 (see FIG. 10) of an outer peripheral surface of the protruding portion 62d and a lower surface of the middle upper wall portion 62 to an intersection point Q (see FIG. 10) of the lower surface of the middle upper wall portion 62 and a rear surface of the middle up-and-down directional coupling wall portion 62a (hereinafter, also referred to as "post-pressing protruding portion-to-middle up-and-down directional coupling wall portion length") D1 is 17 (mm).

As shown in FIG. 10, the post-pressing casing height H1 is the up-and-down directional height of the front up-and-down directional coupling wall portion 61a from a lower surface of the front lower wall portion 64 to an upper surface of the front upper wall portion 61. This means that the pre-pressing casing height H is changed to the post-pressing casing height H1 shown in FIG. 10 by fitting the left front sliding member SL into a guide rail.

The height of the rear up-and-down directional coupling wall portion 63b from a lower surface of the rear lower wall portion 66 to an upper surface of the rear upper wall portion 69, the height of the middle up-and-down directional coupling wall portion 61b from a lower surface of a front front-and-rear directional coupling wall portion La (described later) to an extended end of the middle up-and-down directional coupling wall portion 61b, and the height of the middle up-and-down directional coupling wall portion 63a from a lower surface of a rear front-and-rear directional coupling wall portion Lb (described later) to an extended end of the middle up-and-down directional coupling wall portion 63a are equal to the post-pressing casing height H1.

The post-pressing casing height H1 is substantially equal to the distance between opposing surfaces of the upper rail wall 41 and lower rail wall 42 of the left guide rail 40a. The height of the middle up-and-down directional coupling wall portion 62a from the lower surface of the front front-and-rear directional coupling wall portion La to an extended end of the middle up-and-down directional coupling wall portion 62a and the height of the middle up-and-down directional coupling wall portion 62b from the lower surface of the rear front-and-rear directional coupling wall portion Lb to an extended end of the middle up-and-down directional coupling wall portion 62b are lower than the post-pressing casing height H1 to some extent.

In the left front sliding member SL after being fitted into the guide rail, the mountain-shaped wall portion front-and-rear width W, the leg portion extended length E=F, the top portion height I, the protruding portion protruding distance J, and the middle upper wall portion thickness Th are substantially identical to the corresponding dimensions of the left front sliding member SL before being fitted into the guide rail.

The foregoing dimensions are set based on the following reason. When the left front sliding member SL having the plate-shaped spring 70 accommodated in the middle concave accommodation portion B of the casing 60 is fitted into the left guide rail 40a, the top portion T of the mountain-shaped wall portion 62c is pressed toward an inner surface of the lower rail wall 42 by an inner surface of the upper rail wall 41 of the left guide rail 40a to be moved downward.

The top Tm of the top portion T of the mountain-shaped wall portion 62c thus comes into contact with the inner surface of the upper rail wall 41 of the left guide rail 40a together with upper surfaces of extended ends (upper ends) of the front up-and-down directional connection wall portion 61a, the rear up-and-down directional coupling wall portion 63b, and the middle up-and-down directional coupling wall portions 61b and 63a.

The protruding portion 62d of the middle upper wall portion 62 is moved downward along with the downward movement of the top portion T of the mountain-shaped wall portion 62c to move the longitudinal center of the plate-shaped spring 70 downward. As a result, the longitudinal center of the plate-shaped spring 70 is moved downward while front and rear ends of the plate-shaped spring 70 are engaged on extended ends of the leg portions x of the front portion 65*a* and the rear portion 65*b* of the middle lower wall portion 65, so that the plate-shaped spring 70 is elastically deformed in a downwardly convex curved shape or a bowed downward.

In this state, the plate-shaped spring 70 generates a reaction force in a direction of returning to the original shape. The reaction force becomes an action force to generate a friction force between the top portion T of the mountain-shaped wall portion 62*c* of the casing 60 and the upper rail wall 41 of the left guide rail 40*a* (a friction force generated at the time of sliding the sliding member SL along the inside of the guide rail 40*a*). It is desirable that the action force and the friction force have values that can secure an operation force for realizing a good operation feeling when an occupant operates the sunshade 50 at the time of sliding the sliding member SL along the inside of the guide rail 40*a*.

If the pre-pressing protruding portion-to-middle up-and-down directional coupling wall portion length D is shorter than the post-pressing protruding portion-to-middle up-and-down directional coupling wall portion length D1, when the left sliding member SL slides inside the left guide rail 40*a*, the top portion T of the mountain-shaped wall portion 62*c* is warped or bent by the sliding of the left sliding member SL, so that portions other than the top portion T of the mountain-shaped wall portion 62*c* are pulled. As a result, the casing 60 is deformed by the pulling and it is difficult to appropriately generate the reaction force of the plate-shaped spring 70.

Accordingly, the pre-pressing casing height H, the pre-pressing protruding portion-to-middle up-and-down directional coupling wall portion length D, the leg portion extended length E=F, the top portion height I, and the post-pressing protruding portion-to-middle up-and-down directional coupling wall portion length D1 are set to the respective dimensions described above.

Since the pre-pressing protruding portion-to-middle up-and-down directional coupling wall portion length D is set to be longer than the post-pressing protruding portion-to-middle up-and-down directional coupling wall portion length D1, it is possible to prevent the foregoing pulling in advance and to appropriately secure the reaction force of the plate-shaped spring 70.

As described above, a protruding end surface of a protruding end of the protruding portion 62*d* of the middle upper wall portion 62 is formed in a flat to be parallel to an inner surface of the left guide rail 40*a*. Further, as described above, the top portion T of the mountain-shaped wall portion 62*c* is gently inclined in a front-and-rear direction (in a front-and-rear direction of an motor vehicle) from the top Tm to the respective upper ends of the middle up-and-down directional coupling wall portions 62*a* and 62*b* to form a hem.

Therefore, the top Tm of the top portion T of the mountain-shaped wall portion 62*c* comes into point-contact with the inner surface of the upper rail wall 41 of the left guide rail 40*a*. Meanwhile, radial ends s and t of the protruding end surface of the protruding portion 62*d* come into point-contact with a downwardly bowed upper surface of the longitudinal center of the plate-shaped spring 70. This means that the top portion T of the mountain-shaped wall portion 62*c* and the protruding portion 62*d* form three contact points between the upper rail wall 41 of the left guide rail 40*a* and the plate-shaped spring 70.

As described above, the height I of the top portion T of the mountain-shaped wall portion 62*c* (the top portion height I) is very small, for example, 0.43 (mm). The conventional height I is approximately 1.1 (mm), and thus the value of I=0.43 (mm) is much smaller than the conventional value.

For this reason, when the left front sliding member SL slides inside the left guide rail 40*a*, the left front sliding member SL hardly shakes in the front-and-rear direction (the front-and-rear direction of the motor vehicle), and chattering sound is hardly generated between the upper rail wall 41 and the lower rail wall 42 of the left guide rail 40*a*.

With reference to FIG. 6 or 7, next, a description will be given of the construction of front and rear partitioning portions 80 of the casing 60. The front partitioning portion 80 of the front and rear partitioning portions 80 functions to partition the front concave accommodation portion A and the middle concave accommodation portion B. The front partitioning portion 80 is formed in a U shape defined by the middle up-and-down directional coupling wall portions 61*b* and 62*a* and the portion La of the lower wall 60*b* of the casing 60 between the middle up-and-down directional coupling wall portions 61*b* and 62*a* (hereinafter, also referred to as "front front-and-rear directional coupling wall portion La").

The front partitioning portion 80 thus functions to partition the front concave accommodation portion A and the middle concave accommodation portion B and to alleviate up-and-down directional stress acting on both sides of the front partitioning portion 80 of the casing 60.

The rear partitioning portion 80 functions to partition the middle concave accommodation portion B and the rear concave accommodation portion C. The rear partitioning portion 80 is formed in a U shape defined by the middle up-and-down directional coupling wall portions 62*b* and 63*a* and the portion Lb of the lower wall 60*b* of the casing 60 between the middle up-and-down directional coupling wall portions 62*b* and 63*a* (hereinafter, also referred to as "rear front-and-rear directional coupling wall portion Lb"). The rear partitioning portion 80 thus functions to partition the middle concave accommodation portion B and the rear concave accommodation portion C and to alleviate up-and-down directional stress acting on both sides of the rear partitioning portion 80 of the casing 60.

In the first embodiment, when the left front sliding member SL is mounted on the sunshade 50, forked protruding portions 52 (see FIG. 5) formed at a left front end of the sunshade 50 with a distance therebetween are inserted in and engaged with the front concave accommodation portion A and the rear concave accommodation portion C of the left front sliding member SL. The left front sliding member SL is thus mounted on the left front end of the sunshade 50 (see FIG. 5).

The remaining left rear sliding member SL, right front sliding member SL, and right rear sliding member SL have the same construction as that of the foregoing left front sliding member SL.

The forked protruding portions 52 formed at a left rear end of the sunshade 50 with a distance therebetween are inserted in and engaged with the front concave accommodation portion A and the rear concave accommodation portion C of the left rear sliding member SL. The left rear sliding member SL is thus mounted on the left rear end of the sunshade 50.

The forked protruding portions 52 formed at aright front end of the sunshade 50 with a distance therebetween are inserted in and engaged with the front accommodating portion A and the rear accommodating portion C of the right front sliding member SL. The right front sliding member SL is thus mounted on the right front end of the sunshade 50. Meanwhile, the forked protruding portions 52 formed at a right rear end of the sunshade 50 with a distance therebetween are inserted in and engaged with the front accommodating portion A and the rear accommodating portion C of the right rear sliding member SL. The right rear sliding member SL is thus mounted on the right rear end of the sunshade 50.

In the first embodiment, it is assumed that the sunshade device SD is slidably fitted into the left and right guide rails 40*a* of the guide rail device 40 by the left front, left rear, right front, and right rear sliding members SL, and the sunshade 50 keeps the window 30 fully closed as shown in FIG. 1 or 2.

In the sunshade device SD under this state, the casings 60 of the left front and left rear sliding members SL are fitted into the groove 44 of the left guide rail 40*a* so that the left front and left rear sliding members SL are slidable in the front-and-rear direction. The casings 60 of the right front and right rear sliding members SL are fitted into the groove 44 of the right guide rail 40*a* so that the right front and right rear sliding members SL are slidable in the front-and-rear direction.

In the left front, left rear, right front, and right rear sliding members SL, the top portion T of the mountain-shaped wall portion 62*c* of the casing 60 is pressed toward the lower rail wall 42 by the upper rail wall 41 of the guide rail 40*a*. The top Tm of the top portion T of the mountain-shaped wall portion 62*c* is thus in contact with an inner surface of the upper rail wall 41.

In the respective casings 60, the longitudinal center of the plate-shaped spring 70 is pressed downward so as to be moved downward by a protruding end surface of the protruding portion 62*d* of the middle upper wall portion 62. The plate-shaped spring 70 is thus deformed in a downwardly bowed curved shape with respect to front and rear ends engaged on extended ends of the leg portions x of the front and rear portions 65*a* and 65*b* of the middle lower wall portion 65 (see FIGS. 10 and 11).

In this state, the plate-shaped spring 70 generates a reaction force in a direction of returning to the original shape in response to the downward movement. The reaction force acts to press the top Tm of the top portion T of the mountain-shaped wall portion 62*c* against the inner surface of the upper rail wall 41 of the guide rail 40*a*. The top Tm of the top portion T of the mountain-shaped wall portion 62*c* thus comes into contact with the inner surface of the upper rail wall 41 of the guide rail 40*a* by an action force corresponding to the reaction force.

The pre-pressing casing height H, the pre-pressing protruding portion-to-middle up-and-down directional coupling wall portion length D, the leg portion extended length E=F, the top portion height I, the protruding portion protruding distance J, and the post-pressing protruding portion-to-middle up-and-down directional coupling wall portion length D1 are set to the respective dimensions as described above.

As described above, when the top portion T of the mountain-shaped wall portion 62*c* is pressed, the pre-pressing protruding portion-to-middle up-and-down directional coupling wall portion length D is changed to the post-pressing protruding portion-to-middle up-and-down directional coupling wall portion length D1.

The pre-pressing protruding portion-to-middle up-and-down directional coupling wall portion length D is 17.008 (mm) and the post-pressing protruding portion-to-middle up-and-down directional coupling wall portion length D1 is 17 (mm), and thus D1<D is satisfied.

Moreover, as described above, the top Tm of the top portion T of the mountain-shaped wall portion 62*c* comes into point-contact with the inner surface of the upper rail wall 41 of the corresponding guide rail 40*a*. Meanwhile, the radial ends s and t of the protruding end surface of the protruding portion 62*d* come into point-contact with the curved upper surface of the longitudinal center of the plate-shaped spring 70. The top portion T of the mountain-shaped wall portion 62*c* and the protruding portion 62*d* thus form three contact points between the upper rail wall 41 of the corresponding guide rail 40*a* and the plate-shaped spring 70. As a result, the top portion T of the mountain-shaped wall portion 62*c* and the protruding portion 62*d* can be held stably between the upper rail wall 41 of the corresponding guide rail 40*a* and the plate-shaped spring 70.

As described above, D1<D is satisfied and the top portion T of the mountain-shaped wall portion 62*c* and the protruding portion 62*d* can be held stably between the upper rail wall 41 of the corresponding guide rail 40*a* and the plate-shaped spring 70.

Accordingly, when each of the sliding members SL is slid in the corresponding guide rail 40*a* in the front-and-rear direction (the front-and-rear direction of the motor vehicle), it is possible to prevent the top portion T of the mountain-shaped wall portion 62*c* from being warped by sliding of the left sliding member SL and to prevent portions other than the top portion T of the mountain-shaped wall portion 62*c* from being pulled. The casing 60 is thus not deformed by the pulling.

Consequently, it is possible to appropriately generate the reaction force of the plate-shaped spring 70. Further, by suppressing shaking of the sunshade 50 in the front-and-rear direction (the front-and-rear direction of the motor vehicle), it is possible to prevent in advance chattering sound from being generated.

The reaction force is set to a value that can secure an operation force for realizing a good operation feeling when an occupant operates the sunshade 50 while the chattering sound is prevented from being generated.

In this state, when the occupant M1 grips the recessed grip 50*c* to operate the sunshade 50 in a direction of opening the window 30, the respective sliding members SL slide rearward along the guide rails 40*a*. The window 30 is thus fully opened (see FIG. 3).

As described above, the reaction force of each of the plate springs 70 has a value that can secure the operation force for realizing the good operation feeling when the occupant operates the sunshade 50 while the chattering sound is prevented from being generated, and thus the occupant can slide the sunshade 50 in the front-and-rear direction (the front-and-rear direction of the motor vehicle) with the good operation feeling and without hearing any chattering sound.

As described above, in the respective sliding members SL, the front and rear partitioning portions 80 are provided in the casing 60. Even when the guide rail 40*a* is bent in the front-and-rear direction thereof, therefore, the casing 60 is easily warped between the front concave accommodation portion A and the middle concave accommodation portion B of the casing 60 or between the middle concave accommodation portion B and the rear concave accommodation portion C of the casing 60 with the front-and-rear directional coupling wall portions La and Lb of the front and rear partitioning portions 80 as a reference.

Not only that the bending of the guide rail 40*a* can be efficiently absorbed by the front and rear partitioning portions 80, but also that a longitudinal end of the casing 60 does not interfere with the upper rail wall 41, unlike a case where the casing 60 does not include the front and rear partitioning portions 80 as in a conventional case. As a result, each of the sliding members SL can smoothly slide in the corresponding guide rail 40a.

As described above, because a spring accommodated in the middle concave accommodation portion B of the casing 60 is a plate spring, the plate spring may be formed by punching a leaf spring material. Accordingly, it is unnecessary to perform bending and annealing that are required when a spring curved in advance is used as in a conventional case, and height management and inter-support-point management to determine a reaction force, so that the costs can be reduced.

While a plate spring is used as described above and thus the height management and the inter-support-point management to determine the reaction force of the plate spring are performed in a casing, the casing is formed by resin molding. Therefore, even if the shape of the casing is changed, it does not affect the costs. Consequently, it is possible to reduce the costs of a sliding member.

Figure 12:
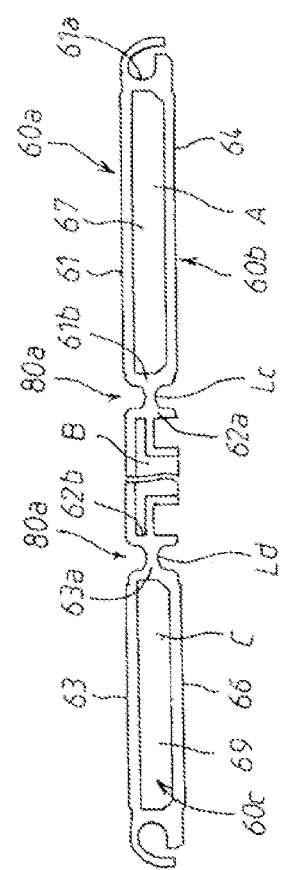
FIG. 12 is a side view of essential portions of a second embodiment according to the present invention.

FIG. 12 shows essential portions of a second embodiment of the present invention. According to the second embodiment, in the casing 60 of each of the sliding members SL described in the first embodiment, front and rear partitioning portions 80a are used instead of the front and rear partitioning portions 80.

The front partitioning portion 80a of the front and rear partitioning portions 80a includes front-and-rear directional coupling wall portions Lc and Ld instead of the front-and-rear directional coupling wall portions La and Lb of the front partitioning portion 80.

Ends of the front-and-rear directional coupling wall portion Lc in a front-and-rear direction are connected to an up-and-down directional center of a front up-and-down directional coupling wall portion 61b and an up-and-down directional of a middle up-and-down directional coupling wall portion 62a, so that the front partitioning portion 80a is formed in an H shape. Ends of the front-and-rear directional coupling wall portion Ld in the front-and-rear direction are connected to an up-and-down directional center of a middle up-and-down directional coupling wall portion 62b and an up-and-down directional of a rear up-and-down directional coupling wall portion 63a, so that the rear partitioning portion 80a is formed in an H shape.

The front partitioning portion 80a thus functions to partition a front concave accommodation portion A and a middle concave accommodation portion B and to alleviate up-and-down directional stress acting on both sides of the front partitioning portion 80a of the casing 60. The rear partitioning portion 80b functions to partition the middle concave accommodation portion B and a rear concave accommodation portion C and to alleviate up-and-down directional stress acting on both sides of the rear partitioning portion 80a of the casing 60. Other constructions are similar to those of the first embodiment.

In the second embodiment, in the respective sliding members SL, the front and rear partitioning portions 80a are provided in the casing 60 as described above, and thus, even when each of the guide rails 40a is bent in a front-and-rear direction thereof, the casing 60 is easily warped between the front concave accommodation portion A and the middle concave accommodation portion B of the casing 60 or between the middle concave accommodation portion B and the rear concave accommodation portion C of the casing 60 with the front-and-rear directional coupling wall portions Lc and Ld of the front and rear partitioning portions 80a as a reference.

Not only that the bending of the corresponding guide rail 40a can be efficiently absorbed by the front and rear partitioning portions 80a, but also that a longitudinal end of the casing 60 according to the second embodiment of the present invention does not interfere with an upper rail wall 41, unlike a case where the casing 60 does not include the front and rear partitioning portions 80a as in a conventional case. As a result, according to the second embodiment, each of the sliding members SL can smoothly slide in the guide rail 40a. Other functions, operations, and effects are similar to those of the first embodiment.

Figure 13:
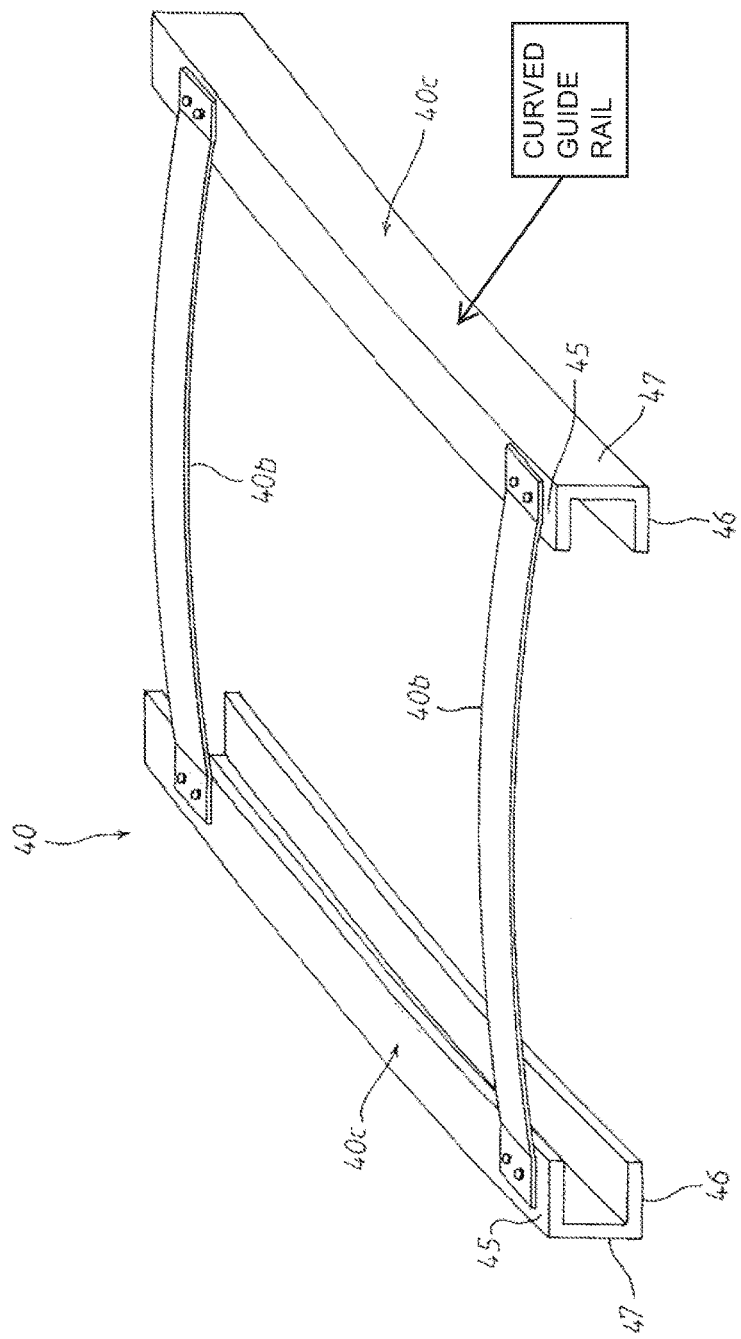
FIG. 13 is a perspective view of essential portions of a third embodiment according to the present invention.

FIG. 13 shows essential portions of a third embodiment of the present invention. According to the third embodiment, a guide rail device (hereinafter, "guide rail device 40") is used instead of the guide rail device 40 described in the first embodiment.

The guide rail device 40 according to the third embodiment includes left and right guide rails 40c instead of the left and right guide rails 40a of the guide rail device 40 described in the first embodiment.

The left and right guide rails 40c are formed in an upwardly bowed curved shape with the same radius of curvature. Accordingly, an upper rail wall 45, a lower rail wall 46, and a bottom wall 47 that constitute each of the left and right guide rails 40c (corresponding to the upper rail wall 41, the lower rail wall 42, and the bottom rail wall 43 of each of the left and right guide rails 40a) are also formed in an upwardly bowed curved shape with the same radius of curvature as that of the left and right guide rails 40c. Front and rear band-shaped support plates 40b are fixed on the left and right guide rails 40c by spot welding and the like as described in the first embodiment, instead of the left and right guide rails 40a described in the first embodiment. Other constructions are similar to those of the first embodiment.

In the third embodiment, in the respective sliding members SL, the front and rear partitioning portions 80 described in the first embodiment are provided in the casing 60 as described above. Even when each of the guide rails 40c is curved in a front-and-rear direction thereof, therefore, the casing 60 is easily warped between a front concave accommodation portion A and a middle concave accommodation portion B of the casing 60 or between the middle concave accommodation portion B and a rear concave accommodation portion C of the casing 60 with front-and-rear directional coupling wall portions La and Lb of the front and rear partitioning portions 80 as a reference.

Accordingly, stress applied to the casing 60 caused by the curved shape of the left and right guide rails 40c is efficiently absorbed by the front and rear partitioning portions 80 and thus the respective sliding members SL can smoothly slide in the guide rails 40c.

Even when the H-shaped partitioning portion 80a is formed in the casing 60 as described in the second embodiment, the stress applied to the casing 60 caused by the curved shape of the left and right guide rails 40c can be efficiently absorbed by the front and rear partitioning portions 80a as described above and therefore, the respective sliding members SL can smoothly slide in the guide rails 40c. Other functions, operations, and effects are similar to those of the first embodiment.

The present invention is not limited to the respective embodiments described above and the following various modifications are provided.

(1) In practicing the present invention, it is not always necessary to have the front and rear band-shaped support plates 40*b* in the guide rail device described in the first embodiment.

(2) In practicing the present invention, the shape of the U-shaped front and rear partitioning portions 80 described in the first embodiment or the H-shaped front and rear partitioning portions 80*a* described in the second embodiment is not limited to a U shape or an H shape, and the front and rear partitioning portions 80 and 80*a* may have, for example, an inverted U shape.

(3) In practicing the present invention, in the first or second embodiment, it is permissible that the casing 60 does not include the U-shaped front and rear partitioning portions 80 or the H-shaped front and rear partitioning portions 80*a*.

(4) In practicing the present invention, the present invention can be applied to windows of sunroofs of various motor vehicles such as not only an motor vehicle but also a bus and a truck.

(5) In practicing the present invention, the pre-pressing protruding portion-to-middle up-and-down directional coupling wall portion length D or the post-pressing protruding portion-to-middle up-and-down directional coupling wall portion length D1 may be the length from a rear intersection point (see FIG. 7 or 10) of an outer peripheral surface of the protruding portion 62*d* and a lower surface of the middle upper wall portion 62 to an intersection point (see FIG. 7 or 10) of the lower surface of the middle upper wall portion 62 and a front surface of the middle up-and-down directional coupling wall portion 62*b*, unlike the embodiments described above.

What is claimed is:

1. A sliding member comprising:
    a casing formed from synthetic resin so as to construct a laterally oriented U-shape in its cross-section with an first wall, a second wall and a third wall longitudinally in a front-and-rear direction, the second wall being between the first wall and the third wall, and
    a plate spring,
    wherein said casing is partitioned and formed at its interior into a front concave accommodation portion, a middle concave accommodation portion and a rear concave accommodation portion by a front partitioning portion and a rear partitioning portion formed between said first wall and said second wall and between said second wall and said third wall, respectively, with a distance therebetween along a front-and-rear direction,
    wherein said second wall includes a middle upper wall portion corresponding to said middle concave accommodation portion, said middle upper wall portion having a mountain-shaped wall portion formed to protrude upwardly in a mountain-shape, and a protruding portion protruding downwardly from said mountain-shaped wall portion,
    wherein said second wall includes a middle lower wall portion corresponding to said middle concave accommodation portion, said middle lower wall portion having an intermediate portion and front and rear coupling wall portions, each of said front and rear coupling wall portions formed to protrude upwardly from respective ends of said intermediate portion, and
    wherein said plate spring is interposed in said middle concave accommodation portion between said front and rear coupling wall portions of said middle lower wall portion and said protruding portion of said middle upper wall portion so as to be a convex curved shape downwardly.

2. The sliding member according to claim 1, wherein said front partitioning portion is formed with front up-and-down directional coupling wall portions forming opposing wall portions of said front concave accommodation portion, and a front front-and-rear directional coupling wall portion coupling said front up-and-down directional coupling wall portions mutually, and
    said rear partitioning portion is formed with rear up-and-down directional coupling wall portions forming opposing wall portions of said rear concave accommodation portion, and a rear front-and-rear directional coupling wall portion coupling said rear up-and-down directional coupling wall portions mutually.

3. The sliding member according to claim 1, wherein said front partitioning portion of said front concave accommodation portion and said middle concave accommodation portion form opposing wall portions of said front concave accommodation portion with a single front up-and-down directional coupling wall portion, and
    said rear partitioning portion of said middle concave accommodation portion and said rear concave accommodation portion form opposing wall portions of said rear concave accommodation portion with a single rear up-and-down directional coupling wall portion.

4. The sliding member according to claim 2, wherein said front partitioning portion of said casing is constructed as a U-shaped front partitioning portion by coupling said front front-and-rear directional coupling wall portion between lower ends of said front up-and-down directional coupling wall portions, and
    said rear partitioning portion of said casing is constructed as a U-shaped rear partitioning portion by coupling said rear front-and-rear directional coupling wall portion between lower ends of said rear up-and-down directional coupling wall portions.

5. The sliding member according to claim 2, wherein said front partitioning portion of said casing is constructed in an H-shape by coupling said front front-and-rear directional coupling wall portion between up-and-down directional intermediate portions of said front up-and-down directional coupling wall portions, and
    said rear partitioning portion of said casing is constructed as an H-shaped rear partitioning portion by coupling said rear front-and-rear directional coupling wall portion between up-and-down directional intermediate portions of said rear up-and-down directional coupling wall portions.

6. A sunshade device provided with sliding members, comprising;
    four sliding members and a sunshade,
    wherein each of said four sliding members includes a casing formed from synthetic resin so as to construct a laterally oriented U-shape in its cross-section with an first wall, a second wall and a third wall longitudinally in a front-and-rear direction, and a plate spring, wherein the second wall is between the first wall and the third wall,
    said casing is partitioned and formed at its interior into a front concave accommodation portion, a middle concave accommodation portion and a rear concave accommodation portion by a front partitioning portion and a rear partitioning portion formed between said first wall and said second wall and between said second wall and said third wall, respectively, with a distance therebetween along a front-and-rear direction,
    said second wall includes a middle upper wall portion corresponding to said middle concave accommodation portion, said middle upper wall portion having a mountain-shaped wall portion formed to protrude upwardly in a mountain-shape, and a protruding portion protruding downwardly from said mountain-shaped wall portion, said second wall includes a middle lower wall portion corresponding to said middle concave accommodation portion, said middle lower wall portion having an intermediate portion and front and rear coupling wall portions, each of said front and rear coupling wall portions formed to protrude upwardly from respective ends of said intermediate portion, and said plate spring is interposed in said middle concave accommodation portion between said front and rear coupling wall portions of said middle lower wall portion and said protruding portion of said middle upper wall portion so as to be a convex curved shape downwardly, and wherein said sunshade has forked protruding portions respectively formed at front, rear, left and right edges of said sunshade, and the forked protruding portions of said sunshade are assembled in said front concave accommodation portion and said rear concave accommodation portion of each of said four sliding members.

7. The sunshade device provided with sliding members according to claim 6, wherein in each of said sliding members, said front partitioning portion is formed with front up-and-down directional coupling wall portions forming opposing wall portions of said front concave accommodation portion, and a front front-and-rear directional coupling wall portion coupling said front up-and-down directional coupling wall portions, and said rear partitioning portion is formed with rear up-and-down directional coupling wall portions forming opposing wall portions of said rear concave accommodation portion, and a rear front-and-rear directional coupling wall portion coupling said rear up-and-down directional coupling wall portions.

8. The sunshade device provided with sliding members according to claim 7, wherein in each of said sliding members, said front partitioning portion of said casing is constructed as a U-shaped front partitioning portion by coupling said front front-and-rear directional coupling wall portion between lower ends of said front up-and-down directional coupling wall portions, and said rear partitioning portion of said casing is constructed as a U-shaped rear partitioning portion by coupling said rear front-and-rear directional coupling wall portion between lower ends of said rear up-and-down directional coupling wall portions.

9. A motor vehicle equipped with a sunshade device and provided with a roof including an outer board having a window formed therein and an inner board having an opening portion formed therein so as to face the window, comprising:

a guide rail device including left and right horizontally oriented U-shaped guide rails mounted on left and right edges of the opening portion of the inner board so as to open oppositely to each other; and a sunshade device including four sliding members and a sunshade, wherein each of said sliding members includes a casing formed from synthetic resin so as to construct a laterally oriented U-shape in its cross-section with an first wall, a second wall, and a third wall longitudinally in a front-and-rear direction, and a plate spring, wherein the second wall is between the first wall and second wall, said casing is partitioned and formed at its interior into a front concave accommodation portion, a middle concave accommodation portion and a rear concave accommodation portion by a front partitioning portion and a rear partitioning portion formed between said first wall and said second wall and between said second wall and said third wall, respectively, with a distance therebetween along a front-and-rear direction, said second wall includes a middle upper wall portion corresponding to said middle concave accommodation portion, said middle upper wall portion having a mountain-shaped wall portion formed to protrude upwardly in a mountain-shape, and a protruding portion protruding downwardly from said mountain-shaped wall portion, said second wall includes a middle lower wall portion corresponding to said middle concave accommodation portion, said middle lower wall portion having an intermediate portion and front and rear coupling wall portions, each of said front and rear coupling wall portions formed to protrude upwardly from respective ends of said intermediate portion, said plate spring is interposed in said middle concave accommodation portion between said front and rear coupling wall portions of said middle lower wall portion and said protruding portion of said middle upper wall portion so as to be a convex curved shape downwardly, wherein said sunshade has forked protruding portions respectively formed at front, rear, left and right edges of said sunshade, and the forked protruding portions of said sunshade are assembled in said front concave accommodation portion and said rear concave accommodation portion of each of said four sliding members, and wherein two sliding members of said four sliding members are slidably fitted at their casings into said left horizontally oriented U-shaped guide rail, and the remaining two sliding members of said four sliding members are slidably fitted at their casings into said right horizontally oriented U-shaped guide rail.

10. The motor vehicle equipped with a sunshade device according to claim 9, wherein said guide rail device is constructed at its left horizontally oriented U-shaped guide rail by a bottom rail wall and upper and lower rail walls extending rightward from upper and lower edges of said bottom rail wall, and is constructed at its right horizontally oriented U-shaped guide rail by a bottom rail wall and upper and lower rail walls extending from upper and lower edges of said bottom rail wall so as to face said upper and lower rail walls of said left horizontally oriented U-shaped guide rail, wherein said left and right horizontally oriented U-shaped guide rails are formed respectively as a curved guide rail so as to have a convex curved shape from one of said upper and lower rail walls to the other rail wall, wherein in each of said sliding members of said sunshade device, said front partitioning portion is formed with front up-and-down directional coupling wall portions forming opposing wall portions of said front concave accommodation portion, and a front front-and-rear directional coupling wall portion coupling said front up-and-down directional coupling wall portions, and said rear partitioning portion is formed with rear upand-down directional coupling wall portions forming opposing wall portions of said rear concave accommodation portion, and a rear front-and-rear directional coupling wall portion coupling said rear up-and-down directional coupling wall portions, and wherein in said sunshade device two sliding members of said four sliding members are slidably fitted at their casings into said left horizontally oriented U-shaped guide rail, and the remaining two sliding members of said four sliding members are slidably fitted at their casings into said right horizontally oriented U-shaped guide rail.

11. The motor vehicle equipped with a sunshade device according to claim 10, wherein in each of said sliding members of said sunshade device, said front partitioning portion of said casing is constructed as a U-shaped front partitioning portion by coupling said front front-and-rear directional coupling wall portion between lower ends of said front up-and-down directional coupling wall portions, and said rear partitioning portion of said casing is constructed as a U-shaped rear partitioning portion by coupling said rear front-and-rear directional coupling wall portion between lower ends of said rear up-and-down directional coupling wall portions, and wherein two sliding members of said four sliding members are slidably fitted at their casings into said left horizontally oriented U-shaped guide rail, and the remaining two sliding members of said four sliding members are slidably fitted at their casings into said right horizontally oriented U-shaped guide rail.

12. The motor vehicle equipped with a sunshade device according to claim 9, wherein in said casing of each of said sliding members, a length between said protruding portion of said middle upper wall portion and one of said front partitioning wall portion and said rear partitioning wall portion, a height of a top portion of mountain-shaped wall portion, an extended length of said front and rear coupling wall portions of said middle lower wall portion and a protruding length of said protruding portion are set in such a manner that a reaction force generated in said plate spring when each of said sliding members is fitted at its casing into corresponding guide rail of said guide rail device to press said mountain-shaped wall portion of each casing into said corresponding guide rail against said each corresponding plate spring becomes an appropriate operation force to said sunshade device for an occupant.

13. The motor vehicle equipped with a sunshade device according to claim 10, wherein in said casing of each of said sliding members, a length between said protruding portion of said middle upper wall portion and one of said front partitioning wall portion and said rear partitioning wall portion, a height of a top portion of mountain-shaped wall portion, an extended length of said front and rear coupling wall portions of said middle lower wall portion and a protruding length of said protruding portion are set in such a manner that a reaction force generated in said plate spring when each of said sliding members is fitted at its casing into corresponding guide rail of said guide rail device to press said mountain-shaped wall portion of each casing into said corresponding guide rail against said each corresponding plate spring becomes an appropriate operation force to said sunshade device for an occupant.

14. The motor vehicle equipped with a sunshade device according to claim 11, wherein in said casing of each of said sliding members, a length between said protruding portion of said middle upper wall portion and one of said front partitioning wall portion and said rear partitioning wall portion, a height of a top portion of mountain-shaped wall portion, an extended length of said front and rear coupling wall portions of said middle lower wall portion and a protruding length of said protruding portion are set in such a manner that a reaction force generated in said plate spring when each of said sliding members is fitted at its casing into corresponding guide rail of said guide rail device to press said mountain-shaped wall portion of each casing into said corresponding guide rail against said each corresponding plate spring becomes an appropriate operation force to said sunshade device for an occupant.

\* \* \* \* \*